Aug. 5, 1969
G. A. NOBLE ET AL
3,460,027
TUBE TESTER FOR DETERMINING IGNITRON TUBE FIRING
CHARACTERISTICS BASED UPON AVERAGE TURN-ON
TIME AND FIRING COUNT
Filed Dec. 1, 1966
2 Sheets-Sheet 1
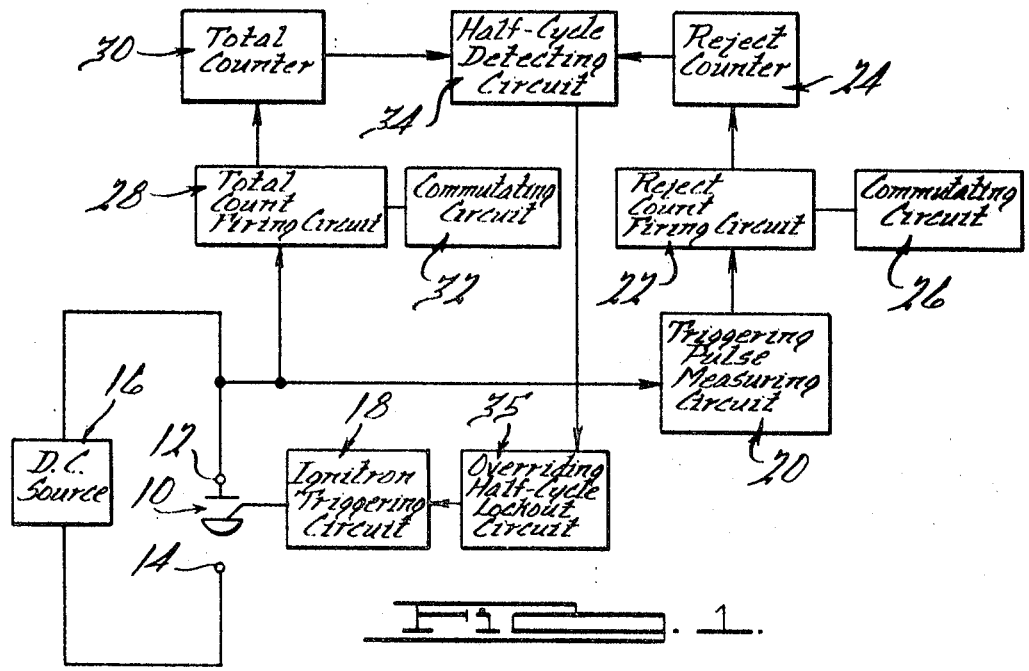
FIG. 1.
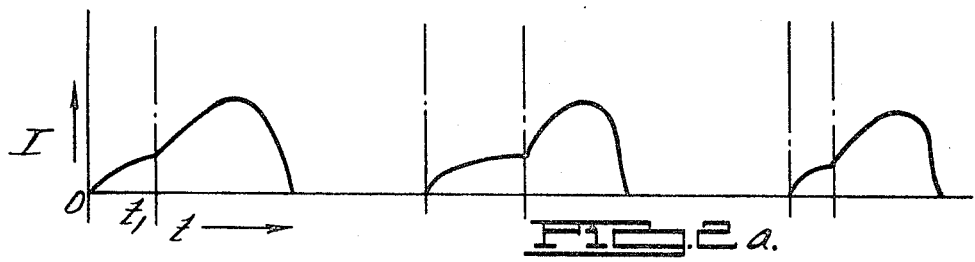
FIG. 2a.
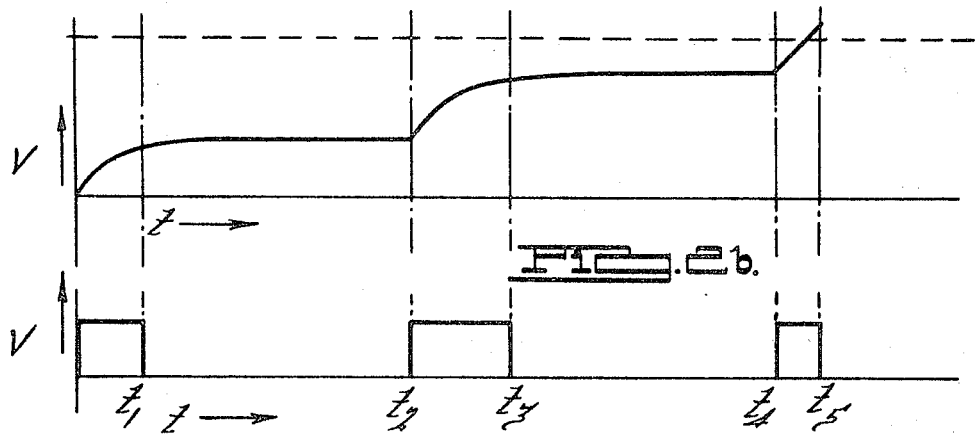
FIG. 2b.
FIG. 2c.
INVENTORS.
Gardiner A. Noble,
BY James M. Cummings
Harness, Talbert & Baldwin United States Patent Office 3,460,027
Patented Aug. 5, 1969

3,460,027
TUBE TESTER FOR DETERMINING IGNITRON TUBE FIRING CHARACTERISTICS BASED UPON AVERAGE TURN-ON TIME AND FIRING COUNT
Gardiner A. Noble, Farmington, and James M. Cummins, Dearborn, Mich., assignors to Chrysler Corporation, Highland Park, Mich., a corporation of Delaware
Filed Dec. 1, 1966, Ser. No. 598,260
Int. Cl. G01r 31/22
U.S. Cl. 324—26    4 Claims

ABSTRACT OF THE DISCLOSURE

Apparatus for testing and rating the quality of ignitron tubes based on the demonstrated capability of the tube to fire for each of a predetermined number of test firing cycles and a measure of the average duration of the ignitor current flow therein prior to turn-on of the tube over that predetermined number of test cycles.

---

This invention relates to a test circuit for determining the firing characteristic and operating quality of ignitron tubes.

When ignitron tubes are employed in production equipment such as resistance welding apparatus, it is desirable to subject the tubes to tests to predict their performance. We have found that a reliable indication of satisfactory firing characteristic is the pulse width of the triggering pulse applied before the ignitron tube actually fires. The elapsed time of the triggering pulse required to turn on the tube serves an indicator for determining a tube of acceptable quality. That is, the shorter the elapsed time, the better the quality of the tube.

Accordingly, it is an object of our invention to provide an improved method and apparatus for testing an ignitron tube whereby a means is provided for triggering the tube a predetermined number of cycles and a means is provided for computing and indicating the average time triggering pulses are applied prior to actual firing of the tube as an indication of the firing characteristic of the tube.

It is a further object of our invention to provide an improved method and apparatus for testing an ignitron tube whereby a means is provided for triggering the tube a predetermined number of cycles, a means is provided for counting the number of cycles fired, a means is provided for deriving a second count which is a function of the time duration the triggering pulses are applied prior to actual firing of the tube and whereby the ratio of the two counts provides an index of the acceptability of the tubes.

It is a still further object of our invention to provide an improved method and apparatus for testing an ignitron tube whereby a means is provided for triggering the tube into conduction over a predetermined number of cycles, a means is provided for counting the number of cycles fired, a means is provided for deriving a second count which is a function of the time duration the triggering pulses are applied prior to actual firing of the tubes and a means is included for disabling the triggering and count means responsive to any single failure of the ignitron tube to fire.

Other objects and further advantages of our invention will become apparent from a consideration of the following specification and drawings in which like numerals refer to like parts and in which:

FIGURE 1 is a block diagrammatic showing of our invention;

FIGURES 2a, 2b and 2c are voltage and current waveform diagrams illustrating the mode of operation of the test circuit.

Figure 3:
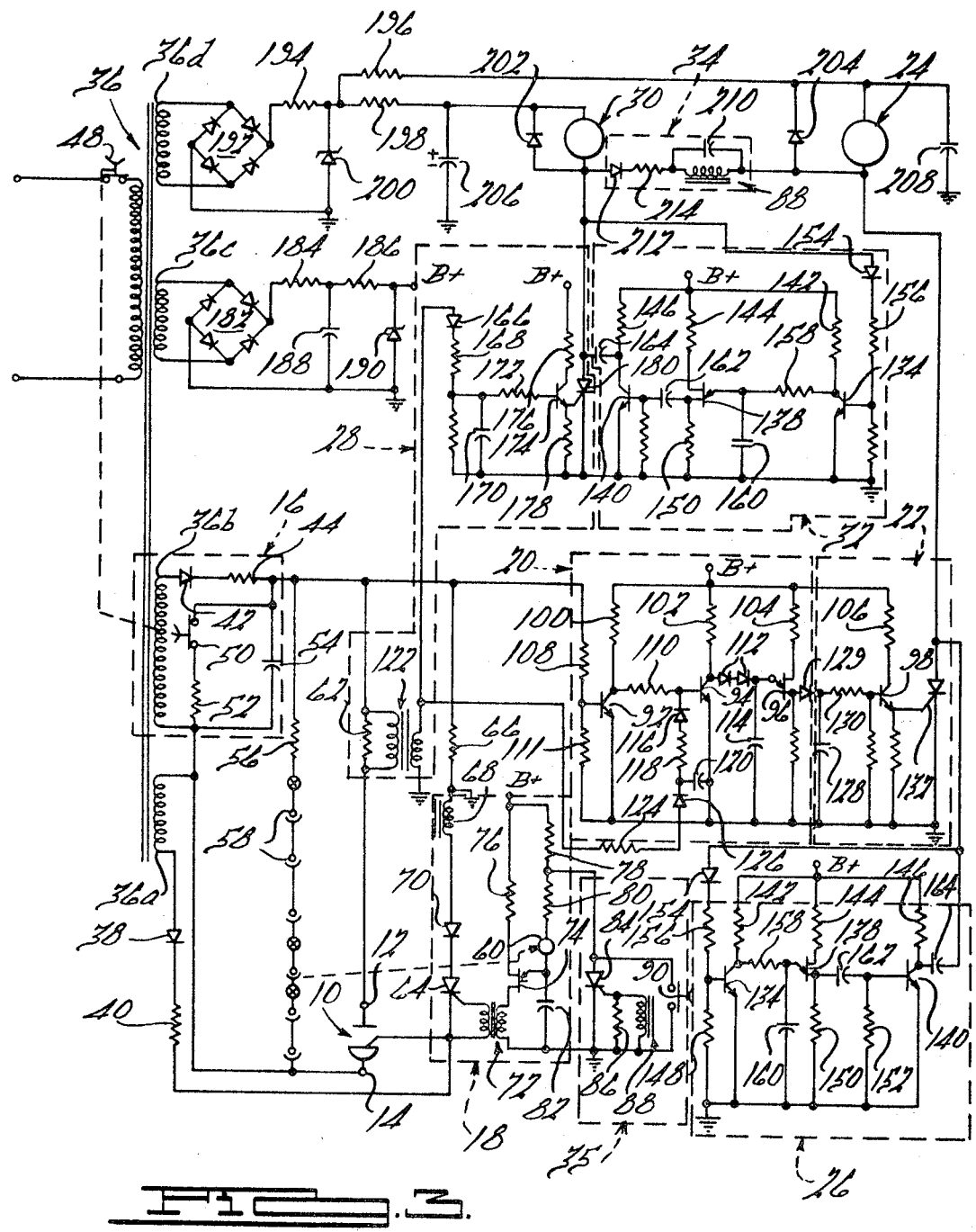
FIGURE 3 is a schematic drawing showing the detail of the present invention.

With more specific reference to the block diagram of FIGURE 1, an ignitron tube 10 is connected preparatory to test between terminals 12 and 14. A DC voltage source 16 is connected across tube 14. The ignitor of tube 10 is connected to a triggering circuit 18 for providing periodic time-spaced triggering voltage pulses to the tube. A triggering pulse measuring circuit 20 is operatively connected to tube 10. It is the function of the triggering pulse measuring circuit 20 to determine the time duration the triggering pulse is applied to the tube ignitor before actual firing of the tube occurs. An output signal which is a function of this time duration is provided to activate a reject count firing circuit 22 which in turn actuates a reject counter 24. Reject counter 24 and total counter 30 may be commercially available counters of the type manufactured and sold by Veeder-Root, Incorporated, of New Britain, Conn. A commutating circuit 26 is connected to the firing circuit to provide its turn-off after a suitable time delay. A total count firing circuit 28 is also connected to the ignitron 10 under test to provide a pulse output each time the tube is fired. The output of the total count firing circuit is accumulated and indicated in a total counter 30. The ratio of the total count to the reject count serves as a reliable index to the firing characteristic and quality of the ignitron tube as will be further explained in the section, "Description of Operations," hereinafter. In general, the lower the reject count is in relation to the total count, the better the quality of the tube. A commutating circuit 32 substantially identical to commutating circuit 26 is employed to turn-off total count firing circuit 28 each time the total counter 30 has been actuated. The system also includes a half cycle or failure detecting circuit 34. Half-cycle detecting circuit 34 serves to detect the condition when a tube under test does not fire within a reasonable length of time, for example, a time period of the order of 400 microseconds. A signal is developed which interrupts operation of the triggering circuit 18 and of the entire system through an overriding half-cycle lockout circuit 35. The basic purpose of our test system is to determine whether a tube will fire for a predetermined number of cycles under proper operating conditions. If it does fire, the test circuit indicates through the counters a ratio of the number of times triggering pulses are applied to a number which is representative of the time duration the triggering pulses are applied to the ignitron before actual firing commences. With proper choice of the value of certain components and the number of cycles fired, the reading of the reject counter 24 can be made to indicate directly the average pulse width expressed in microseconds.

FIGURES 2a–2c are voltage and current waveforms of critical points in the system which illustrate the mode and theory of operation of the test circuit. The significance of these waveforms and their time relationship will be fully discussed in relation to the circuit in the section, "Description of Operation," hereinafter.

FIGURE 3 is a detailed schematic of our invention wherein the various circuits of the test system are labeled with numerals corresponding to those of FIGURE 1 to clarify their functional interrelation. Ignitron tube 10 has its power terminals connected between terminals 12 and 14. A suitable AC operating voltage is supplied through the primary winding of transformer 36 to the several operating portions of the circuit. Secondary winding 36a is connected in series with diode 38 and resistor 40 across the cathode and ignitor of tube 10. Secondary winding 36b is connected in series with diode 42 and resistor 44 to provide a pulsating DC supply 16. A pair of gang operated switches 48 and 50 are included to initiate the operation of the circuit as shown. A resistor 52 is connected in series with switch 50 and the terminal of secondary winding 36b. Capacitor 54 is further connected as shown and paralleled by the series combination of a current limiting resistor 56 and a series of glow tubes 58. One of the glow tubes is operatively coupled a photosensitive device 60. The plate of ignitron 10 has a resistor 62 connected in series between it and the positive terminal of DC source 16. Ignitron triggering circuit 18 includes as its major components a silicon controlled rectifier 64 having its output connected to the ignitor of ignitron tube 10. The anode of controlled rectifier 64 is connected to the positive terminal of DC source 16 through resistor 66, inductor 68, and diode 70. Controlled rectifier 64 is periodically triggered on through transformer 72 by the periodic operation of unijunction transistor 74. To provide this operation, transistor 74 is normally biased off through resistors 76, 78, 80. In series with resistor 80 and the emitter of transistor 74 is a photosensitive device 60 which device is physically coupled to one of the neon tubes 58. Accordingly, each time capacitor 54 becomes fully charged, tube 58 is lighted causing light to impinge on photosensitive device 60. This immediately lowers the resistance of photosensitive device 60 and causes capacitor 82 to charge up. Transistor 74 is rendered conductive and silicon controlled rectifier 64 is turned on to provide in turn a triggering pulse to the ignitor of ignitron 10. A silicon controlled rectifier 84 is included with its anode connected to the junction of resistors 78 and 80 and its cathode connected to the lower terminal of capacitor 82. During the normal operation of the test circuit, silicon controlled rectifier 84 remains off. A resistor 86 is connected across the gate and cathode of silicon controlled rectifier 84. The secondary of a transformer 88 is also shunted across the gate and cathode of silicon controlled rectifier for turn-off to disable the entire circuit responsive to failure of an ignitron to fire. A reset switch 90 is provided to turn off silicon controlled rectifier 84 to permit normal testing operation of the circuit. Silicon controlled rectifier 84 and its associated circuit comprise the overriding half-cycle lockout circuit 35 of FIGURE 1, the operation and purpose of which will be explained fully in the section, "Description of Operation," hereinafter.

Trigger pulse measuring circuit 20 includes as its major operating components transistors 92, 94, 96, 98 coupled to a source of B+ potential through resistors 100, 102, 104, 106, respectively, as shown. Resistors 108 and 111 are connected to the base of transistor 92 as shown. The signal across resistor 66 is developed prior to turn-on of ignitron tube 10. This signal is fed through resistor 110, transistor 94, diodes 112 to charge capacitor 114. A series network comprising diode 116, resistor 118 and capacitor 120 is connected across the base-emitter of transistor 94. As soon as ignitron tube 10 fires, transformer 122 which has its primary winding connected in shunt with resistor 62 develops through its secondary winding a pulse signal which passes through resistor 124 and diode 126 to capacitor 120 where it overrides the effects of the transistor 94 signal developed across resistor 66 and turns on transistor 94. Transistor 94 is thus rendered sharply conductive as soon as ignitron tube 10 fires. The signal voltage previously stored on capacitor 114 therefore represents that portion of the signal developed across resistor 66 before the ignitron tube 10 fires. Each time the ignitron tube 10 is fired, the voltage stored on capacitor 114 rises until the voltage on the emitter of transistor 96 is sufficient to provide a turn-on pulse thereto. The values of resistor 102 and capacitor 114 are chosen so that, at the end of 400 total counts, the actual reading on the reject counter will be the average duration the triggering pulses are applied to ignitron 10 before it fires. The following stage including diode 129, capacitor 128, resistor 130 and transistor 98 operates to widen the pulse to provide a drive to the gate of silicon controlled rectifier 132 and thereby initiate a count on reject counter 24. A commutating circuit 26 is also included to provide a delayed turn-off of silicon controlled rectifier 132. The commutating circuit includes transistors 134, 138 and 140 connected as shown with resistors 142, 144, 146, 148, 150, 152 connected to their respective control and power electrodes as shown. When controlled rectifier 132 turns on, counter 24 is actuated and the voltage across controlled rectifier 132 drops to zero. Transistor 140 is turned off. The voltage drop across silicon controlled rectifier 132 also drops the signal applied through diode 154 and resistor 156 to the base of transistor 134 which is then turned off. This permits current flow through resistors 142 and 158 to charge capacitor 160. When capacitor 160 is charged to a sufficiently high voltage level, it turns unijunction transistor 138 on to pass a triggering pulse through capacitor 162 to the base of transistor 140 to turn it back on. Transistor 164 then back biases silicon controller rectifier 132 through capacitor 164 to turn it off.

The total count firing circuit 28 will next be given consideration. When ignitron tube 10 is fired, an output pulse is provided from transformer 122 through diode 166 and resistor 168 to charge capacitor 170 to a level sufficient to provide a turn-on signal to the base of transistor 174 through signal resistor 172. Transistor 174 is connected with resistors 176 and 178 as shown and is normally in a non-conductive state. When transistor 174 is turned on, it triggers silicon controlled rectifier 180 into conduction to actuate the operation of total counter 30. Thus, a total count is provided each time ignitron tube 10 is fired. A regulated DC source is provided for the triggering circuit and commutating circuit transistors through secondary winding 36c, full wave rectifier 182, resistors 184, 186, capacitor 188 and Zener diode 190 in a manner well known to the art.

Commutating circuit 32 is substantially the same in its components and mode of operation to commutating circuit 26. In the interest of brevity, like numerals have been applied to both commutating circuits and the description of commutating circuit 26 and its components hereinabove provided will not be repeated.

It will be seen that a common regulated DC supply is provided for counters 30 and 24 which includes full wave rectifier 192, resistors 194, 196, 198 and Zener diode 200. Counters 30 and 24 are paralleled by diodes 202 and 204, respectively, with capacitors 206, 208 as shown.

Failure-to-fire detecting circuit 34 is connected between counters 30 and 24 as shown. Included in this ignitron failure detecting circuit is the primary of transformer 88 which is shunted by capacitor 210. A series network comprising diode 212 and resistor 214 is coupled as shown. When an ignitron tube under test fails completely to fire, the voltage across silicon controlled rectifier 180 remains while the voltage across silicon controlled rectifier 132 drops to zero. This forward biases diode 212 to develop a voltage across the primary of transformer 88. The output signal from the secondary of transformer 88 then triggers on silicon controlled rectifier 84 to shunt unijunction transistor 74 and inhibit further firing of silicon controlled rectifier 64 and ignitron tube 10. The entire circuit is then paralyzed in its operation until reset switch 90 is depressed. Under normal operating conditions when both counters fire, the reject counter 24 always fires slightly ahead of the total counter 30. When the last pulse which is going to turn on reject counter 24 is just below the voltage level of turn on for unijuction transistor 96, the next following pulse arrives and, at the very beginning of the pulse, transistor 96 is turned on. This provides a signal through transistor 98. Silicon controlled rectifier 132 is fired to actuate reject counter 24 and drop the potential across controlled rectifier 132. This potential stays down until the next firing of ignitron 10 so that the reject counter turn on occurs always a time period slightly before total counter tur n on. The RC network including resistor 214 and capacitor 210 prevents silicon controlled rectifier from turning on when this condition occurs. Otherwise stated, the RC network provides a delay to insure the signal is present a predetermined time length before a voltage is developed sufficient to trigger the primary of transformer 88 and operate the half-cycle lockout circuit.

Description of operation

The description of operation of the circuit of FIGURE 3 will now be made with particular reference to the several FIGURE 2 waveforms. The curve shown in FIGURE 2a represents ignitor current for ignitron tube 10. At times $t_0$, $t_2$ and $t_4$ it will be seen that there is a slow rise of ignitor current as soon as a triggering pulse is applied from controlled rectifier 64. Ignitor current flow is limited by the ignitor resistance itself. When the ignitron tube 10 becomes conductive at $t_1$, $t_3$ or $t_5$, the ignitor electrode is immediately surrounded by a conducting plasma, the presence of which shunts out the ignitor resistance. The ignitor current thus increases rapidly as shown in the latter portion of the current waveform. It is the time duration of the first portion of the waveform. in each case, for example, $t_0$, to $t_1$, that we are interested in. The time duration of this interval is a reliable criterion of the acceptability of the tube. The shorter the time a triggering pulse must be applied before tube firing occurs, the better the tube.

The normal sequence of operation begins when the tube 10 is placed between terminals 12 and 14. AC operating voltage is provided through transformer 36 when switches 48 and 50 are closed. Capacitor 54 is charged to a relatively high voltage and the series of neon tubes 58 is turned on. This causes light from one of the bulbs to impinge on photo-sensitive device 60 which is in series with the emitter of unijunction transistor 74. The lowered resistance of the device permits the voltage on capacitor 82 to rise to a level that turns on transistor 74 which in turn turns on controlled rectifier 64. A triggering pulse is thus initiated to the ignitor of tube 10. Before ignitron tube turn-on occurs, a signal is developed across resistor 66. This signal is fed into transistor 92 where it is amplified and through transistor 94 where it is stored in capacitor 114. As soon as the ignitron tube fires, such as at times $t_1$, $t_3$ and $t_5$ in the FIGURE 2 drawings, a signal is developed across resistor 62. This signal is passed through transformer 122 and into transistor 94 where it overrides the effect of the signal previously developed across resistor 66. Transistor 94 is therefore rendered sharply conductive as soon as ignitron tube 10 fires. The voltage stored on capacitor 114 as shown in FIGURE 2b thus represents only the portion of the signal developed across resistor 66 before the tube fired. Capacitor 114 is thus step-charged on each tube firing in the manner shown toward the firing voltage level of unijunction transistor 96 which level is shown by a dash line in FIGURE 2b. FIGURE 2 shows the collector voltage of transistor 94. Each time ignitron tube 10 is fired, a voltage proportional to the time required to fire the tube is stored on capacitor 114. When the voltage stored on capacitor 114 reaches the firing level of transistor 96 such as between $t_4$ and $t_5$, it will be fired to provide a pulse output. This pulse is widened and provided to trigger silicon controlled rectifier 132 into conduction to actuate a count of reject counter 24. Turn-off of silicon controlled rectifier 132 is provided by commutating network 26 in the manner hereinbefore described.

The operation of the total counter 30 is initiated at the time tube 10 is fired. A signal is developed across resistor 62 and transformer 122 which triggers transistor 174 which in turn switches silicon controlled rectifier 180 into conduction to actuate total counter 30. Commutating circuit 32 then turns off silicon controlled rectifier 180 in a like manner to that previously described for commutating network 26. The final count of total counter 30 after a predetermined number of tube firing cycles then may be compared to the final count on reject count 24. The lower the reject count is relative to the total count, the better the quality of the tube.

Provision is also made for the situation where an ignitron tube fails completely to fire. This condition which has been characterized as "half cycling" of the tube is indicated through the operation of the half-cycle detecting and lockout circuits 34 and 35. When there is failure to fire, the entire triggering sequence is stopped by silicon controlled rectifier 84. The test cycle can then be recommenced only by operation of reset switch 90.

It will thus be seen that we have provided a new and improved circuit for testing the firing characteristic of ignitron tubes.

We claim:

1. A circuit for testing the firing characteristic of an ignitron tube comprising a semiconductor controlled rectifier having its output connected to the ignitor of said tube for applying time-spaced triggering pulses thereto to fire it cyclically, a transistor having one of its principal electrodes connected to the gate of said controlled rectifier for initiating its conduction, a pulsating voltage connected to the control electrode of said transistor for periodically operating it, a total counter operatively connected to said ignitron for indicating the total count number of firing cycles, an RC network operatively connected to said controlled rectifier and said ignitron for providing an output representative of the time duration triggering pulses are applied to the ignitor of said ignitron prior to its firing, a reject counter operatively connected to the output of said network for indicating a reject count representative of said time duration whereby the ratio of said total count to said reject count is representative of the firing characteristic of said ignitron.

2. The combination as set forth in claim 1 wherein a means is operatively connected to said triggering means for inhibiting its operation responsive to failure of said ignitron to fire.

3. The combination as set forth in claim 1 wherein said last-mentioned means comprises a transformer primary winding operatively connected between the input to said total counter and the input to said reject counter and a transformer secondary winding operatively connected to said transistor for turning it off responsive to operation of said reject counter without corresponding operation of said total counter.

4. A circuit for testing the firing characteristic of an ignitron tube comprising triggering means for applying time-spaced pulses to said tube to fire it cyclically, a total counter operatively connected to said ignitron for indicating the total number of times said ignitron tube is fired, storage means operatively connected to said triggering means for accumulating voltages, each representative of the time duration a triggering pulse is applied to the ignitor of said ignitron tube prior to its firing, a reject counter actuable each time a predetermined voltage level of said storage means is reached to indicate a reject count whereby the ratio of the total count to the reject count is representative of the firing characteristic of said tube, means for disabling said triggering means responsive to operation of said reject counter without corresponding operation of said total counter, a pair of silicon control rectifiers each connected to a different one of said counters for actuating it, and a pair of commutating networks each connected to a different one of said silicon control rectifiers for delay turn-off thereof.

References Cited

UNITED STATES PATENTS

| | | | |
|---|---|---|---|
| 2,789,267 | 4/1957 | Beal | 324—26 XR |
| 2,847,570 | 8/1958 | Brown | 324—57 |
| 2,946,020 | 7/1960 | Hudson | 324—57 XR |
| 2,956,223 | 10/1960 | Cass | 324—24 |
| 2,962,609 | 11/1960 | MacDonald | 324—28 XR |

RUDOLPH V. ROLINEC, Primary Examiner

E. L. STOLARUN, Assistant Examiner

U.S. Cl. X.R.

324—158